(12) United States Patent
Kuehne et al.

(10) Patent No.: US 9,703,375 B2
(45) Date of Patent: Jul. 11, 2017

(54) OPERATING DEVICE THAT CAN BE OPERATED WITHOUT KEYS

(71) Applicant: AUDI AG, Ingolstadt (DE)

(72) Inventors: Marcus Kuehne, Beilngries (DE); Ulrich Mueller, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 15/105,500

(22) PCT Filed: Sep. 13, 2014

(86) PCT No.: PCT/EP2014/002482
§ 371 (c)(1),
(2) Date: Jun. 16, 2016

(87) PCT Pub. No.: WO2015/090485
PCT Pub. Date: Jun. 25, 2015

(65) Prior Publication Data
US 2016/0320835 A1    Nov. 3, 2016

(30) Foreign Application Priority Data

Dec. 20, 2013   (DE) .................... 10 2013 021 931

(51) Int. Cl.
*B60K 37/00*   (2006.01)
*G06F 3/041*   (2006.01)
(Continued)

(52) U.S. Cl.
CPC ............. *G06F 3/013* (2013.01); *B60K 37/00* (2013.01); *G06F 3/0414* (2013.01);
(Continued)

(58) Field of Classification Search
CPC ........ B06K 37/00; B06K 37/06; B06K 35/00; B06K 2350/00–2350/967;
(Continued)

(56) References Cited

U.S. PATENT DOCUMENTS

| 2004/0046739 A1 | 3/2004 | Gettemy |
| 2005/0134570 A1 | 6/2005 | Strawn et al. |

(Continued)

FOREIGN PATENT DOCUMENTS

| CN | 102662573 A | 9/2012 |
| DE | 10121392 A1 | 11/2002 |

(Continued)

OTHER PUBLICATIONS

International Search Report for PCT/EP2014/002482 mailed Nov. 26, 2014.

(Continued)

*Primary Examiner* — Jennifer Mehmood
*Assistant Examiner* — Sardis F Azongha
(74) *Attorney, Agent, or Firm* — Staas & Halsey LLP

(57) ABSTRACT

A display device uses a display panel to display a graphical object representing a function to initiate on a device for selection by a user. An eye tracker generates a line-of-vision signal that is dependent on a line of vision of the user. A sensor device ascertains, in a predetermined holding region by which the user holds the operator control apparatus with at least one hand, a holding pressure of the at least one hand and generates a pressure signal that is dependent on the holding pressure. A control device uses the line-of-vision signal to check whether the user looks at the object, in which case the selected function is initiated if the pressure signal satisfies a predetermined initiation criterion.

12 Claims, 1 Drawing Sheet

(51) Int. Cl.
*G06F 3/01* (2006.01)
*G06F 3/0482* (2013.01)

(52) U.S. Cl.
CPC .... *G06F 3/0482* (2013.01); *B60K 2350/1028* (2013.01); *B60K 2350/1052* (2013.01); *B60K 2350/2013* (2013.01)

(58) Field of Classification Search
CPC . B06K 2350/2013; G06F 3/013; G06F 3/015; G06F 3/0414; G06F 3/0482; B60Q 1/00; B62D 1/00; B62D 1/22; B60W 50/08
See application file for complete search history.

(56) References Cited

U.S. PATENT DOCUMENTS

| | | | |
|---|---|---|---|
| 2008/0316181 A1 | 12/2008 | Nurmi | |
| 2009/0085383 A1* | 4/2009 | Hicks | B60K 35/00 297/217.3 |
| 2010/0110368 A1 | 5/2010 | Chaum | |
| 2012/0131491 A1 | 5/2012 | Lee | |
| 2012/0169582 A1* | 7/2012 | Tschirhart | G02B 27/01 345/156 |
| 2013/0169560 A1* | 7/2013 | Cederlund | G06F 3/013 345/173 |
| 2016/0188181 A1* | 6/2016 | Smith | G06F 3/048 715/765 |

FOREIGN PATENT DOCUMENTS

| | | |
|---|---|---|
| DE | 10236769 A1 | 2/2004 |
| DE | 102005025993 A1 | 7/2006 |
| DE | 102007017509 A1 | 10/2008 |
| DE | 102007024141 A1 | 11/2008 |
| DE | 102007020936 A1 | 12/2008 |
| EP | 1562102 A2 | 8/2005 |
| EP | 2371649 A1 | 10/2011 |
| WO | 02/088824 A2 | 11/2002 |

OTHER PUBLICATIONS

German Office Action for Appln. No. 102013021931.0 dated Jul. 29, 2014.

International Preliminary Report on Patentability dated Dec. 3, 2015 for International Application PCT/EP2014/002482 and English translation thereof (10 pages total).

English translation of International Preliminary Report on Patentability for PCT/EP2014/002482 mailed Jun. 23, 2016.

Office Action dated Jan. 5, 2017 in corresponding Chinese Patent Application No. 201480058217.6.

* cited by examiner

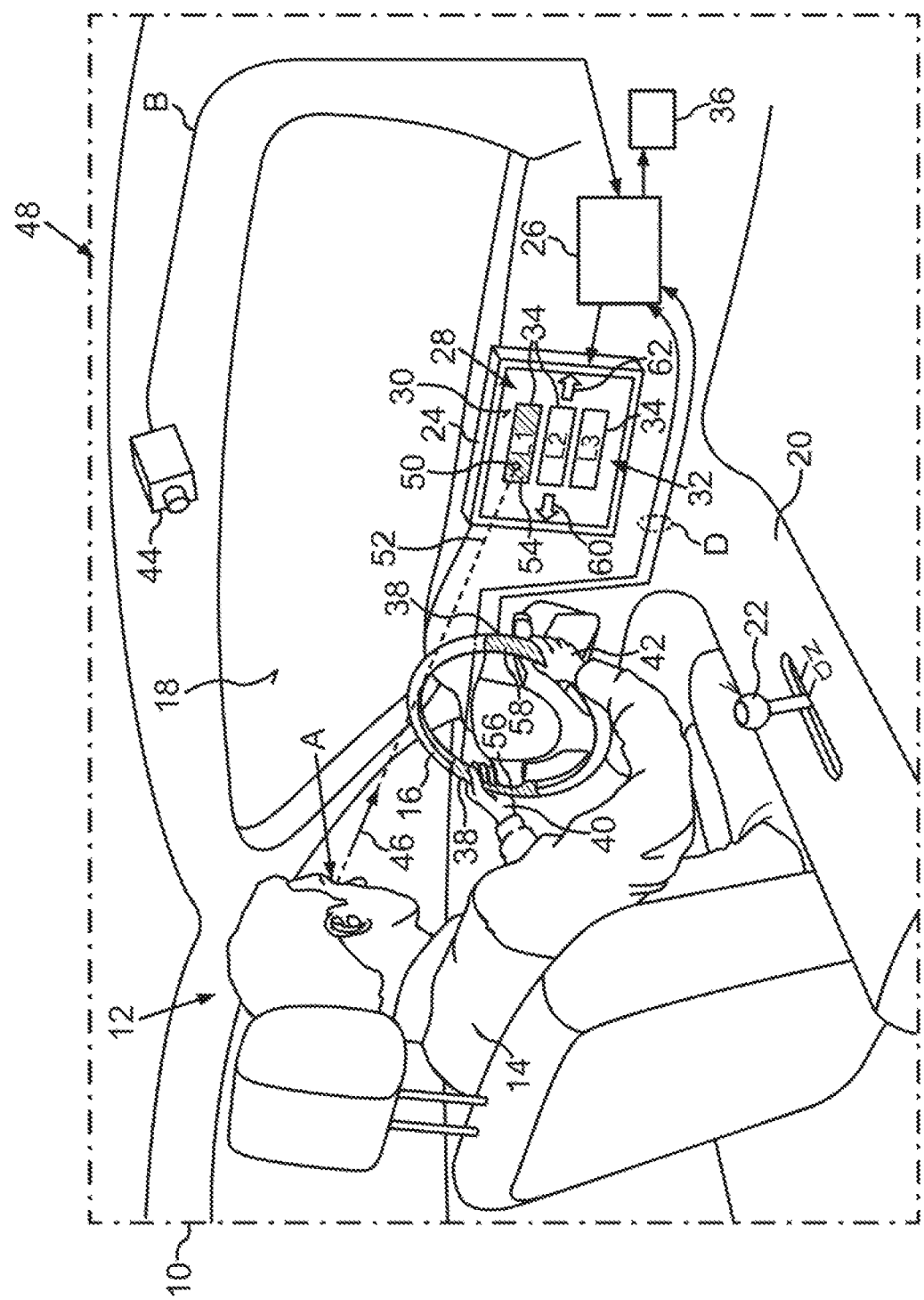

OPERATING DEVICE THAT CAN BE OPERATED WITHOUT KEYS

CROSS REFERENCE TO RELATED APPLICATIONS

This application is the U.S. national stage of International Application No. PCT/EP2014/002482, filed Sep. 13, 2014 and claims the benefit thereof. The International Application claims the benefit of German Application No. 10 2013 021 931.0 filed on Dec. 20, 2013, both applications are incorporated by reference herein in their entirety.

BACKGROUND

Described below is an operator control apparatus for a device, by which operator control apparatus a user can select and thereby activate a function of the controlled device. The operator control apparatus involves a display device displaying a graphical object, for example an icon or a list entry, that represents the function. The user can then select this object and thereby activate the function. The operator control apparatus does not require the user to push a particular key either to select the object or to activate the function.

In this regard, US 2004/0046739 A1 discloses a smartphone that has a housing having elastic walls. When the user holds the smartphone in his hand and exerts pressure on the elastic walls, this is recognized by a pressure sensor of the smartphone and used to control a function of the smartphone. Graphical objects, such as icons or list entries, additionally need to be selected by the user on a touchscreen of the smartphone using his finger in this case.

US 2008/0316181 A1 discloses a smartphone that has pressure sensors on its housing that detect the finger position of the hand holding the smartphone. In this case, the user can select graphical objects on a screen using his finger position on the housing.

US 2005/0134570 A1 discloses a keypad that, instead of single, mobile keys, has a self-contained housing having elastic housing regions that each act as a key.

US 2010/0110368 A1 discloses data goggles that incorporate a touch sensor that senses tapping on the data goggles.

DE 101 21 392 A2 discloses a motor vehicle in which a line of vision is taken as a basis for selecting a control function that can then be activated by the operator by a haptic operator control element. The operator control element is arranged on a steering wheel of the motor vehicle. A disadvantage of this operator control apparatus is that the user needs to change his finger position while driving in order to be able to use a finger to push the operator control element on the steering wheel.

US 2010/013491 A1 discloses an eye tracker that detects a line of vision of an operator and detects a trajectory of a visual focus that a user moves over a display panel by changing his line of vision.

SUMMARY

The method enables a user to unerringly select and initiate a specific function of a device.

Initiation of the function of the device, may be selected via eye tracking after pressure buildup on a housing of the device.

To this end, the operator control apparatus of the device has a display device for displaying a graphical object representing the function, that is to say, by way of example, an icon or a list entry on an operator control menu or a selection list. In addition, the operator control apparatus has an eye tracker for generating a line-of-vision signal that is dependent on a line of vision of the user. Furthermore, a sensor device is provided that is designed to ascertain, in a predetermined grip region or holding region for holding the operator control apparatus, a holding pressure of at least one hand of the user and to generate a pressure signal that is dependent on the holding pressure. A control device of the operator control apparatus, for example a microcontroller or another processor device, is designed to perform the following method.

According to the method, the display device displays the graphical object and the eye tracker generates the line-of-vision signal and the sensor device generates the pressure signal. The control device uses the line-of-vision signal to check whether the user looks at the object. If this is the case, that is to say that the user looks at the object, then the function represented by the graphical object is initiated if additionally the pressure signal satisfies a predetermined initiation criterion. In other words, the user now merely needs to look at the object and, before, during or afterwards, then alter the holding pressure within the holding region by which he is holding the operator control apparatus. This initiates the function that is represented by the graphical object at which he is currently looking.

The method described below provides an advantage that the user does not need to change his hand position while he is holding the operator control apparatus and selecting a function of the device. The user can thus hold the operator control apparatus on the holding region throughout and does not need to change his grip, e.g. in order to operate a key. Variation of the holding pressure is sufficient.

According to one development, the control device controls the display device such that the display device presents a marking element on the display panel. The control device takes the line-of-vision signal as a basis for positioning the marking element on the display panel. By way of example, the marking element may be a mouse pointer or another pointer element that is arranged on the display panel onto the on the basis of a line of vision. The marking element may also be a marker, e.g. a coloration, by which that object at which the user is currently looking is equipped or identified. It is thus also possible to use the display panel to present multiple objects, each of which represents one of multiple functions of the device. The user can select one of the objects by sweeping his gaze. The marking element advantageously displays to the user which of the objects can currently be activated for selection by hand pressure or holding pressure.

According to one development, the initiation criterion includes the holding pressure described or signaled by the pressure signal being greater than a predetermined threshold value. This results in the advantage that the user can use his hand to hold the operator control apparatus within the holding region throughout and can then generate the initiation signal to initiate the selected function only when required by increasing the holding pressure. The initiation criterion can e.g. also prescribe a pattern for the profile of the pressure signal, e.g. pushing twice.

While the initiation criterion is not satisfied, Thus, the holding region can also be used for other control tasks. Thus, in one development, the control device checks the line-of-vision signal for object selection, that is to say that the eye tracker is thus active, only if the control device recognizes from the pressure signal that the user actually touches the holding region with the hand. Thus, if the user lets go of the holding region, then the eye tracking is also deactivated as a result.

In addition or as an alternative to the pressure signal, another touch signal, which is dependent on a touch to the holding region, can also be used to control the eye tracker in the manner described, e.g. by dint of a capacitive sensor or a photodetector or a heat detector.

Additionally or alternatively, it is also possible to check whether the user touches a minimum area or more than the minimum area with the hand within the holding region. This makes it possible to prevent random initiation, for example by dint of tapping on the holding region when the operator control apparatus is tucked into or removed from a pocket.

In another development of the method, the display device alters the display content presented on the display panel depending on where the holding pressure signaled by the pressure signal acts within the holding region. As a result, it is advantageously possible to control page turning or movement or scrolling through the display content by the pressure-sensitive holding region, for example. By way of example, the user can thus use a finger to increase the pressure in an upper portion of the holding region and thereby initiate page turning or scrolling upward, for example, and/or, if a pressure is exerted in an opposite lower region of the holding region, page turning or scrolling downward.

According to another development, the display device scrolls a display content presented on the display panel if the control device recognizes from the pressure signal a frictional movement by the at least one hand within the holding region. By way of example, the user can thus use a finger to sweep along a surface of the operator control apparatus within the holding region and thereby displaces the display content on the display panel. It is thus possible to scroll or displace a list that contains more list entries than can be presented on the display panel, for example.

Further embodiments relate to the physical embodiment of the operator control apparatus. In particular, the holding region is provided by housing walls or a skin, e.g. on a steering wheel.

According to one embodiment, the display device is mounted in a housing of the operator control apparatus, and the holding region is formed on the housing, i.e. represented or provided by the housing itself. The user can thus advantageously hold the display device in his hand. The holding region may be provided by an elastic housing wall, for example, with the sensor device including at least one sensor, for example a strain gauge, that generates the pressure signal on the basis of a deformation of the housing wall.

According to another embodiment, the operator control apparatus has a housing that has two housing shells mounted so as to be mobile toward one another. In this case, a relative position of the housing shells in relation to one another is dependent on the holding pressure. By way of example, the two housing shells may be pushed apart by a spring, so that when the two housing shells are pushed together, they are displaced toward one another, the displacement distance being dependent on the holding pressure. In this case, the sensor device is designed to generate the pressure signal on the basis of a relative situation of the housing shells. The display device is mounted particularly between the housing shells.

The operator control apparatus is also suitable for operating different types of devices. According to one development, the operator control apparatus is integrated in the device, such as a portable communication device, for example, a smartphone or tablet PC or PDA (Personal Digital Assistant) or notebook, for example. According to another development, the operator control apparatus may be part of a motor vehicle. By way of example, the holding region may in this case be embodied as part of a steering wheel of the motor vehicle, and the display device may be, by way of example, an HUD (Head Up Display) and/or a screen, for example, in a central console of the motor vehicle. In this case, the motor vehicle may be embodied as a motor car, particularly as an automobile. The device that needs to be operated by the operator control device may be, e.g., an infotainment system of the motor vehicle and/or a navigation system and/or a media player.

BRIEF DESCRIPTION OF THE DRAWINGS

These and other aspects and advantages will become more apparent and more readily appreciated from the following description of the exemplary embodiments, taken in conjunction with the accompanying drawings of which:

The single FIGURE (FIGURE) shows a schematic illustration of an embodiment of the operator control apparatus.

DETAILED DESCRIPTION OF THE PREFERRED EMBODIMENT

Reference will now be made in detail to the preferred embodiments, examples of which are illustrated in the accompanying drawings, wherein like reference numerals refer to like elements throughout.

In the exemplary embodiment explained below, the described components of the embodiment are each individual features that can be considered independently of one another and each also develops the invention independently of one another and hence can also be regarded as part of the invention individually or in a combination other than the one shown. Furthermore, the embodiment described can also be augmented by further instances of the features that have already been described.

The drawing shows a passenger compartment 12 of a motor vehicle 10. By way of example, the motor vehicle 10 may be a motor car, for example an automobile. It shows a driver 14, a steering wheel 16, a windshield 18, a central console 20, a stick shift 22 and a display device 24. By way of example, the display device 24 may be a screen arranged on the central console 20 or, by way of example, even an HUD. A control device 26 can control a display content 28 that is presented on a display panel 30 of the display device 24. By way of example, the control device 26 may include a microcontroller or, by way of example, be provided by a program module of a processor device of the motor vehicle 10.

In the example shown, a selection list 32 having list elements 34 as display content 28 is displayed by way of example. Each list element 34 is a graphical object that represents a respective function of a device 36 of the motor vehicle 10. By way of example, the device 36 may be an infotainment system or a navigation system or another device that is designed for operation via a dashboard or an infotainment system of the motor vehicle 10. Selectable functions may include navigation, media reproduction, telephony, etc.

In the case of the motor vehicle 10, the driver 14 does not have to operate keys or other buttons in order to activate the desired function of the device 36, however. The driver 14 can simply look at the display panel 30 with one eye A or both eyes and in so doing look at that list entry 34 that represents the desired function. In the example, it is assumed that the driver 14 wishes to activate a function that is represented by the list entry L1, for example activation of a CD player. The driver 14 looks at the list entry L1 and pushes a holding region 38 with his left hand 40 or his right hand 42, which selects the list entry L1 that he has looked at, this being recognized by the control device 26, which then activates the relevant function of the device 36.

Overall, the control device 26, the display device 24, the holding region 38 and an eye tracker 44, which detects a line of vision 46 of the eye A or of both eyes of the driver 14, therefore provide an operator control apparatus 48 for the device 36. Overall, the operator control apparatus 48 operates as follows in this case:

The eye tracker 44 generates a line-of-vision signal B that is received by the control device 26. In this case, the eye tracker 44 may be embodied in a manner that is known per se. The line-of-vision signal B describes the line of vision 46 and/or a visual focus 50, which describes a point of intersection between a visual axis 52, which is described by the line of vision 46, and the display panel 30, for example. The control device 26 can graphically represent the visual focus 50 on the display panel 30, which provides the driver 14 with orientation. Additionally or alternatively, the list entry L1 marked by the visual focus 50 can be graphically distinguished from the other list entries L2, L3 by a marker 54 or visually distinguished from the other graphical objects 34 in a general manner. In this case, the graphically represented visual focus 50 and the marker 54 each form a marking element. The holding region 38 can include a sensor device having at least one pressure-sensitive sensor. The sensor device generates a pressure signal D that is received by the control device 26. As soon as the pressure signal D satisfies an initiation criterion, for example the pressure of one of the hands 40, 42 exceeds a threshold value or the threshold value is exceeded twice in succession within a predetermined period of time or another predetermined pattern for a pressure profile of the pressure signal D is recognized, the control device 26 initiates that function of the device 36 that is represented by that list entry L1, L2, L3 that the driver 14 has of course just looked at, that is to say in this case the list entry L1.

Provision may also be made for the holding region 38 to have two or more subregions 56, 58. In this case, provision may be made for the display content 28 to be altered if the driver 14 uses his left hand 40 to push the left subregion 56, as seen at the steering wheel 16 in the direction of travel, in a left half of the steering wheel 16. By way of example, the display list 32 can be scrolled out from the display panel 30 in a direction of displacement 60 and/or the page can be turned to a different selection list. Equally, the pressure with the right hand 42 on the right subregion 58 can initiate to page turning or scrolling in a direction 62. As a result, by pushing the respective subregion 56, 58, the driver 14 can change to different user menus or presentations or, in general, graphical objects 34.

The control device 26, the display device 24, the holding region 38 and the eye tracker 44 may also be integrated, by way of example, in a portable communication device, for example a smartphone, which is then the operated or controlled device 36, rather than in a motor vehicle 10. It is thus possible for a user to hold the communication device in one hand. During the interaction with this eye-tracking-based interface of the communication device, the selection is then made from a menu or a list point, for example, using the eyes. The user then confirms the selection by the pressure buildup on the communication device, for example the housing thereof if the holding region 38 is provided on the housing. If a mobile device, that provides communication, particularly a smartphone, is operated via line of vision, then the user will normally hold it in his hand. To confirm the selection, the user can therefore now fix his gaze on a menu/list item and confirm by pressure buildup on the housing held in his hand.

In future, it is thus also possible for mobile devices to be rendered operable by eye tracking to an increasing extent. To date, only recognition of the viewed region stared at has been possible in this regard. The method could in the future allow the specific viewed point to be recognized, and the user will then be able to stare specifically at points determined on the display, for example icons, and then initiate an interaction with the points. In this case, the invention allows the specific initiation of the function that is stared at to be effected by altering a pressure, particularly increasing a holding pressure, in a holding region of the operator control apparatus for the communication device.

Overall, ion initiation of a function is selected via eye tracking in the case of a motor vehicle and a communication device in combination with pressure buildup on a housing or, in general, a holding region.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

The invention claimed is:

1. A method for operating an operator control apparatus for a device to initiate a function of the device, as selected by a user, comprising:
   displaying, by a display device using a display panel, a graphical object representing the function;
   generating, by an eye tracker, a line-of-vision signal dependent on a line of vision of the user when activated by a control device;
   detecting, by a sensor device, in a predetermined holding region by which the user holds the operator control apparatus with at least one hand, a holding pressure of the at least one hand;
   generating, by the sensor device, a pressure signal dependent on the holding pressure;
   activating the eye tracker by the control device to generate the line-of-vision signal indicating whether the user looks at the object, only if the control device recognizes from at least one of the pressure signal and another touch signal dependent on a touch to the holding region, that the user touches the holding region with the at least one hand without satisfying a predetermined initiation criterion; and
   initiating the function, by the control device, when the user looks at the graphical object and the pressure signal satisfies the predetermined initiation criterion.

2. The method as claimed in claim 1, wherein the control device takes the line-of-vision signal as a basis for positioning a marking element on the display panel.

3. The method as claimed in claim 2, wherein the initiation criterion includes the holding pressure indicated by the pressure signal being greater than a predetermined threshold value.

4. The method as claimed in claim 3, wherein the display device alters a display content presented on the display panel based on the pressure signal depending on where the holding pressure acts within the holding region.

5. The method as claimed in claim 4, wherein the display device scrolls a display content presented on the display panel when the control device recognizes from the pressure signal a frictional movement by the at least one hand within the holding region.

6. The method as claimed in claim 3, wherein the user touches the holding region with the at least one hand without satisfying the predetermined initiation criterion when said detecting detects the holding pressure as less than the predetermined threshold of the pressure signal.

7. The method as claimed in claim 1, wherein the initiation criterion includes the holding pressure indicated by the pressure signal being greater than a predetermined threshold value.

8. The method as claimed in claim 1, wherein the display device alters a display content presented on the display panel based on the pressure signal depending on where the holding pressure acts within the holding region.

9. The method as claimed in claim 1, wherein the display device scrolls a display content presented on the display panel when the control device recognizes from the pressure signal a frictional movement by the at least one hand within the holding region.

10. An operator control apparatus by which a user operates a controlled device that has at least one function, comprising:
　　a display device, mounted in a housing of the operator control apparatus, displaying a graphical object representing a function of the controlled device;
　　an eye tracker generating a line-of-vision signal dependent on a line of vision of the user when activated;
　　a sensor device detecting a holding pressure of at least one hand in a predetermined holding region formed on the housing and used in holding the operator control apparatus, and generating a pressure signal dependent on the holding pressure; and
　　a control device controlling the displaying of the graphical object by the display device, activating the eye tracker and checking the line-of-vision signal from the eye tracker only when at least one of the pressure signal from the sensor device and another touch signal dependent on a touch to the holding region, indicates that the user touches the holding region with the at least one hand without satisfying a predetermined initiation criterion, and initiating the function when the user looks at the graphical object and the pressure signal satisfies the predetermined initiation criterion.

11. The operator control apparatus as claimed in claim 10, wherein the housing of the operator control apparatus has two housing shells, mounted so as to be mobile relative to one another, and having a relative position in relation to one another dependent on the holding pressure, and wherein the sensor device generates the pressure signal based on the relative position of the housing shells.

12. The operator control apparatus as claimed in claim 11, wherein at least one of
　　the operator control apparatus is integrated in the controlled device, and
　　the operator control apparatus is one of a portable communication device and a motor vehicle.

\* \* \* \* \*